United States Patent
Kasuga et al.

[11] Patent Number: 5,844,881
[45] Date of Patent: Dec. 1, 1998

[54] OBJECTIVE LENS DRIVING DEVICE CAPABLE OF HOLDING AN OBJECTIVE LENS AT A SPECIFIC NEUTRAL POINT

[75] Inventors: Ikuo Kasuga; Fumio Kobayashi; Toru Kamada; Akihiko Okumura, all of Nagano, Japan

[73] Assignee: Kabushiki Kaisha Sankyo Seiki Seisakusho, Nagano, Japan

[21] Appl. No.: 494,224

[22] Filed: Jun. 23, 1995

[30] Foreign Application Priority Data

Jun. 28, 1994 [JP] Japan ................................ 6-168915

[51] Int. Cl.⁶ ............................ G02B 7/02; G11B 21/10
[52] U.S. Cl. ...................... 369/244; 369/44.22; 359/824
[58] Field of Search ................................ 369/244, 251, 369/44.14, 44.15, 44.22; 359/819, 823, 824

[56] References Cited

U.S. PATENT DOCUMENTS

| | | | |
|---|---|---|---|
| 4,790,628 | 12/1988 | Nanno et al. | 359/824 X |
| 4,863,240 | 9/1989 | Nakajima et al. | 359/824 X |
| 4,998,802 | 3/1991 | Kasuga et al. | 350/247 |
| 5,488,603 | 1/1996 | Tomita et al. | 359/824 X |

FOREIGN PATENT DOCUMENTS 1-317234  12/1989  Japan .

*Primary Examiner*—Stuart S. Levy
*Assistant Examiner*—William R. Korzuch
*Attorney, Agent, or Firm*—Sughrue, Mion, Zinn, Macpeak & Seas, PLLC

[57] ABSTRACT

An objective lens driving device includes drive coils mounted on one of a lens holder bearing an objective lens and a stationary member; magnets mounted on the other in such a manner that said drive coils are confronted with the magnets, and the lens holder is moved in a focusing direction and a tracking direction by application of current to the drive coils; and magnetic pieces arranged in magnetic circuits including the magnets, so that magnetic attraction forces acting on the magnetic pieces produce restoring forces two-dimensionally in the focusing direction and in the tracking direction to hold the objective lens at a neutral point. The magnetic pieces are so arranged that, at the neutral point, the drive coils are confronted straightly with the magnets.

4 Claims, 2 Drawing Sheets

OBJECTIVE LENS DRIVING DEVICE CAPABLE OF HOLDING AN OBJECTIVE LENS AT A SPECIFIC NEUTRAL POINT

BACKGROUND OF THE INVENTION

The present invention relates to an objective lens driving device.

An optical disk device with an optical disk as a recording medium uses an optical pick-up to write data signals in the disk or to read them therefrom. The optical pick-up uses an objective lens driving device to apply a laser beam to data pits of the disk with high accuracy. Hence, it is required for the objective lens driving device to accurately position the objective lens two-dimensionally in a focusing direction and in a tracking direction. In order to perform this two-dimensional follow servo with high accuracy, a structure for holding the objective lens at a predetermined neutral point (or rest neutral position) is important, affecting the performance of the optical pick-up.

In this connection, means for holding the objective lens at the neutral point has been disclosed by Japanese Patent Unexamined Publication No. Hei. 1-317234. With the means, a magnetic restoring force is provided to hold the objective lens at the neutral point.

More specifically, the objective lens driving device disclosed by Japanese Patent Unexamined Publication No. Hei. 1-317234 is designed as follows: Magnets are arranged confronted with drive coils. The magnets thus arranged are for instance focusing magnets which are obtained by magnetization so as to have the north and south poles of the magnets in the focusing direction. In magnetic circuits including the focusing magnets, thin-plate-shaped magnetic pieces which are elongated vertically are arranged. Magnetic attraction forces acting on the magnetic pieces produce restoring forces two-dimensionally in the focusing direction and in the tracking direction, so that the holder bearing the objective lens is held at the neutral position.

However, the objective lens driving device disclosed by Japanese Patent Unexamined Publication No. Hei. 1-317234 suffers from the following difficulties:

Not only in the case where the magnets are mounted on the lens holder, but also in the case, instead of the magnets, the drive coils are mounted on the lens holder, the lens holder sinks from the designed neutral point by its gravity. The amount of sink of the lens holder from the designed neutral point is larger when the magnets are mounted on the lens holder because they are heavier than the drive coils.

In order to eliminate the above-described difficulty, offset voltage (DC voltage) is applied to the drive coils when the device is operated. However, the application of the offset voltage to the drive coils is not preferable, because the drive coils generate heat, and the device is increased in power consumption as much.

SUMMARY OF THE INVENTION

In view of the foregoing, an object of the invention is to provide an objective lens driving device which is able to hold the objective lens at the neutral point without application of offset voltage to the drive coils.

The foregoing object of the invention has been achieved by an objective lens driving device in which drive coils are mounted on one of two components, which are a lens holder bearing an objective lens and a stationary member, and magnets are mounted on the other in such a manner that the drive coils are confronted with the magnets, and the lens holder is moved in a focusing direction and a tracking direction by application of current to the drive coils, and in which magnetic pieces are arranged in magnetic circuits including the magnets, so that magnetic attraction forces acting on the magnetic pieces produce restoring forces two-dimensionally in a focusing direction and in a tracking direction, thereby to hold the objective lens at a neutral point; characterized in that the magnetic pieces are so arranged that, at the neutral point, the drive coils are confronted straightly with the magnets.

Further, in the objective lens driving device of the invention, the magnetic pieces whose positions are designed with respect to the lens holder are shifted axially downwardly as much as the actual amount of sink of the lens holder with respect to the designed neutral point which is due to the gravity of the lens holder, or the designated positions of magnetization of the focusing magnet section are shifted axially upwardly as much as the same amount of sink of the lens holder, so that the lens holder is lifted in the direction of axis as much. Accordingly, the drive coils and the magnets are confronted straightly with each other at the neutral point, whereby the objective lens is held at the designed neutral point.

DETAILED DESCRIPTION OF THE INVENTION

Figure 1:
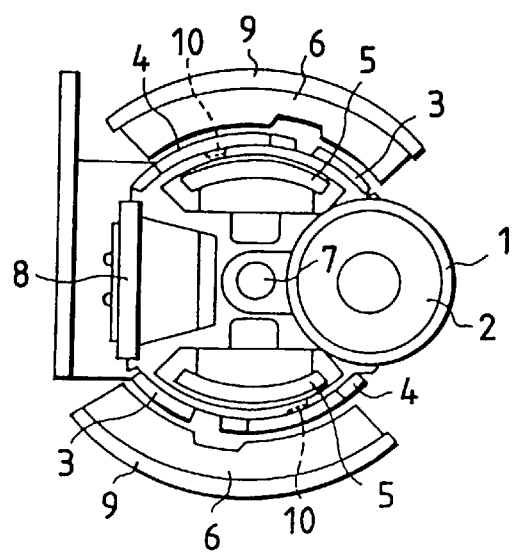
FIG. 1 is a plan view showing an objective lens driving device, which constitutes a first embodiment of the invention.
Figure 4:
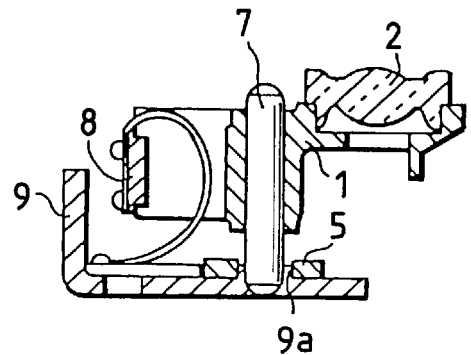
FIG. 4 is a sectional view showing an objective lens and its relevant components.

Preferred embodiments of the invention will be described with reference to the accompanying drawings.

FIGS. 1 through 5 shows an objective lens driving device, which constitutes a first embodiment of the invention. In FIGS. 1 through 5, reference numeral 1 designates a lens holder. The lens holder 1 is mounted on a fixed shaft 7 in such a manner that it is swingable about and movable along the shaft 7. An objective lens 2 is held by the holder 1 in such a manner that its optical axis is in parallel with the axis of the shaft 7. A balancer 8 is fixedly secured to the lens holder 1 on one side of the shaft 7 which is opposite to the side where the objective lens 2 is provided. A pair of focusing drive coils 4 and a pair of tracking drive coils 3 are fixedly mounted on the outer cylindrical surface of the lens holder 1 in such a manner that they are located symmetrical with respect to the shaft 7. The outer cylindrical surface of the lens holder 1, on which the focusing drive coils 4 and the tracking drive coils 3 are fixedly mounted, is made up of arcuate surfaces with the shaft 7 at the center. Those coils 4 and 3 are fixedly secured to the lens holder 1 being curved along the arcuate surfaces of the holder 1.

The shaft 7 is fixedly mounted on a stationary member, namely, an outer yoke 9 at the center. More specifically, the shaft 7 is press-fitted in a boss 9a which is formed by burring the central portion of the outer yoke 9, or it is fixed in the boss 9a by welding. The outer yoke 9 includes right and left sector-shaped portions which are located on both sides of the shaft 7. The sector-shaped side portions are bent at right angles, thus providing raised portions which are curved inwardly and confront with the coils 4 and 3. More specifically, the raised portions of the outer yoke 9 are formed by bending the sector-shaped side portions along a circumference whose center is at the shaft 7. Magnets 6 are fixedly mounted on the inner surfaces of the raised portions of the yoke 9, respectively. The magnets 6 are made integral with the raised portions, for instance, by use of resin binder.

Figure 6:
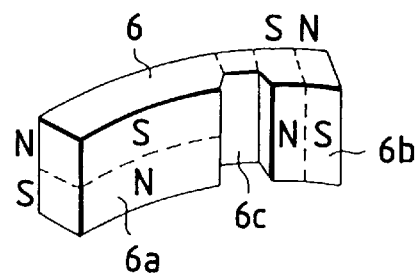
FIG. 6 is a perspective view of the magnet.

Each of the magnets 6, as shown in FIG. 6, has a groove 6c at the middle which is extended in the direction parallel to the shaft 7, so that the magnet 6 has a focusing magnet section 6a and a tracking magnet section 6b on both sides of the groove 6c.

The focusing magnet section 6a is subjected to magnetization so as to have N and S poles which are arranged in the direction of the shaft 7. The tracking magnet section 6b is also magnetized in a direction perpendicular to the direction of magnetization of the focusing magnet section 6a so as to have N and S poles which are arranged in the direction of a circumference around the shaft. The magnet sections 6a and 6b, namely, the magnets 6 are arranged on the above-described arcuate surfaces of the raised portions of the yoke.

Figure 2:
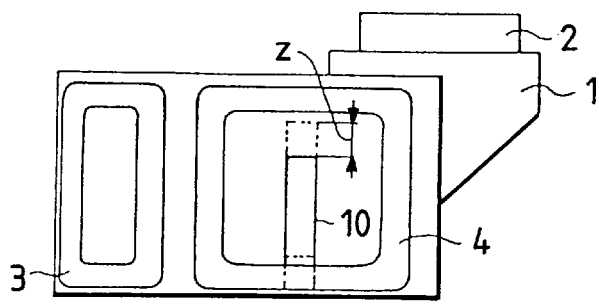
FIG. 2 is a front view of a lens holder for a description of the mounting position of a magnetic piece.
Figure 5:
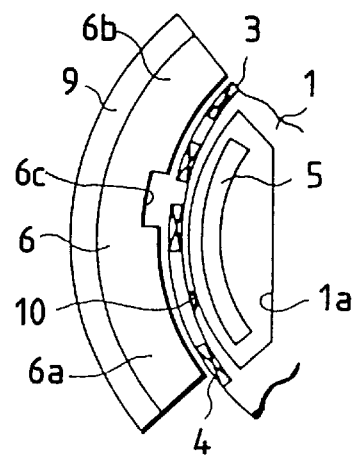
FIG. 5 is an enlarged plan view of a magnet and coils and their relevant components.
Figure 3:
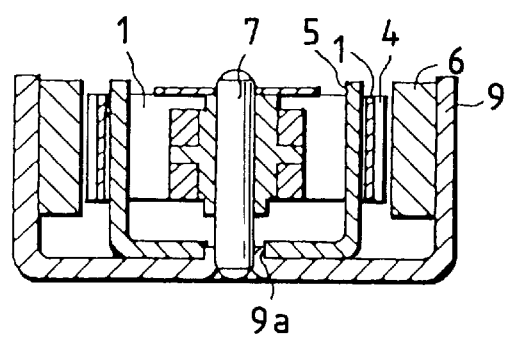
FIG. 3 is a vertical sectional view of the objective lens driving device shown in FIG. 1.

The focusing drive coils 4, as shown in FIG. 2, are each in the form of a rectangle whose horizontal sides are longer than the vertical sides. The focusing drive coils 4 are so arranged that the longer sides confront with the magnetic poles of the focusing magnet sections 6a. On the other hand, the tracking drive coils 3 are each in the form of a rectangle whose vertical sides are longer than the horizontal sides. The tracking drive coils 3 are so arranged that the longer sides confront with the magnetic poles of the tracking magnet sections 6b.

An inner yoke 5 is set inside the outer yoke 9, and fitted to the outside of the boss 9a so that it is fixedly mounted on the outer yoke 9. Similarly as in the case of the outer yoke 9, the inner yoke 5 includes a pair of sector-shaped side portions on both sides of the shaft 7. The sector-shaped side portions are bent at right angles, thus forming raised portions which confront with the raised portions of the yoke 9. More specifically, the raised portions of the inner yoke 5 are formed by bending the sector-shaped side portions along a circumference whose center is at the shaft 7, thus being curved inwardly. The raised portions are extended through windows 1a formed in the lens holder 1 with gaps in the windows 1a, and are confronted through the coils 4 and 3 with the magnet sections 6a and 6b. As is apparent from the above description, the inner yoke 5 has the shaft 7 at the center, and the drive coils 3 and 4 are set outside the inner yoke 5, the magnets 6 are set outside the drive coils 3 and 4, and the outer yoke 9 is set outside the magnets 6; in other words, the inner yoke 5, the drive coils 3 and 4, the magnets 6, and the outer yoke 9 are arranged coaxially around the shaft 7 in the stated order, so that a substantially closed magnetic circuit is formed through those components.

Figure 7:
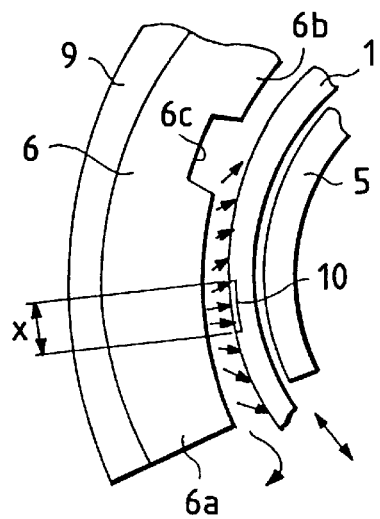
FIG. 7 is a plan view of essential components of the objective lens driving device, showing the magnetic flux formed around the magnetic piece.
Figure 8:
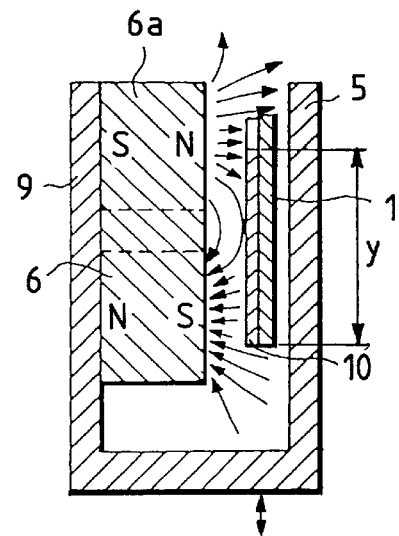
FIG. 8 is a vertical sectional view of essential components of the objective lens driving device, showing the magnetic flux formed around the magnetic piece.

A pair of magnetic pieces 10 are fixedly secured to the sector-shaped outer peripheral portions of the lens holder 1 at positions corresponding to the magnetic pole centers (center portion) of the focusing magnet sections 6a, respectively. Each of the magnetic pieces 10, as shown in FIGS. 7 and 8, is in the form of a thin plate. Its width x measured along a circumference whose center is at the shaft 7 is much smaller than the width of the focusing magnet section 6a measured along the same circumference, and its length y measured in the direction of the shaft 7 is smaller than the length of the focusing magnet section 6a measured in the same direction.

The positions of the magnetic pieces 10 on the lens holder 1 are determined as follows: With the actual amount of sink of the lens holder 1 (including the lens 2, the drive coils 3 and 4, and the balancer 8, strictly stated) due to its gravity taken into account, the positions of the magnetic pieces 10 are shifted in the direction of the shaft from conventionally designed mounting positions (where the centers of the magnetic pieces as viewed in the direction of the shaft are coincided with the centers of the drive coils as viewed in the same direction). That is, in order to cancel out the amount of sink of the lens holder 1 due to its gravity, as shown in FIG. 2, each of the magnetic pieces 10 is shifted downward from the conventionally designed mounting position (indicated by the phantom lines) as much as the actual amount of sink z measured from the designed neutral point of the lens holder 1.

The objective lens driving device thus designed operates as follows:

First, the fundamental focusing and tracking operations of the device will be described. When driving current is applied to the focusing drive coils 4, the driving current and the magnetic flux of the magnetic circuit produce a thrust, so that the objective lens 2 together with the lens holder 1 is moved in the direction of optical axis, thus performing a focusing operation. On the other hand, when driving current is applied to the tracking drive coils 3, the driving current and the magnetic flux of the magnetic circuit produce a thrust, so that the objective lens 2 together with the lens holder 1 is moved in the tracking direction, thus performing a tracking operation.

Next, the relation between the magnetic flux outputs of the focusing magnet sections 6a and the magnetic pieces 10 will be described. Each of the focusing magnet sections 6a is so magnetized as to have the magnetic poles which are arranged in the direction of the shaft 7. As shown in FIG. 7, in a plane perpendicular to the shaft 7, the magnetic flux density is maximum at the middle of the gap as viewed circumferentially of the shaft 7, and gradually decreased towards both ends of the gap.

The magnetic attraction force of the focusing magnet section 6a acts on the magnetic piece 10, and in addition a restoring force acts on the magnetic piece 10 which is equivalent to an elastic restoring force to stably hold it at the point maximum in magnetic flux. This restoring force causes the lens holder 1 to be held at the neutral point in the circumferential direction, whereby the objective lens 2 is held at the neutral point in the tracking direction.

The above-described restoring force is proportional to the gradient of magnetic flux distribution and the area of the magnetic piece 10. In a range of normal movement of the objective lens in the tracking direction, the gradient of magnetic flux changes approximately linearly. Hence, the restoring force is substantially uniform when the objective lens moves normally in the tracking direction.

On the other hand, as shown in FIG. 8, in a section of the focusing magnet section 6a taken in the direction of the shaft 7, the focusing magnet section 6a is magnetized to have magnetic poles which are arranged in the direction of the shaft 7. Accordingly, in the gap accommodating the magnetic piece 10, the gradient of magnetic flux is inverted at the middle of the gap as viewed in the direction of the shaft 7. The magnetic piece 10 is a part of the magnetic path, and it is magnetically attracted towards the center of the magnetization region. This attraction force acts as a restoring force, so that the lens holder 1 is held at a predetermined position in the direction of the shaft 7, and accordingly the objective lens 2 is held at the neutral point in the focusing direction. As was described above, the magnetic piece 10 is a part of the magnetic path from the focusing magnet section 6a. This feature increases the magnetic flux density, thus contributing to an increase in response characteristic of the objective lens driving device, and providing a wide range of magnetic restoring forces.

As was described before, in the conventional objective lens driving device, the lens holder sinks from the designed neutral point because of its gravity. On the other hand, in the device of the invention, as was described above, each of the magnetic pieces 10 is shifted downwards from the conventionally designed mounting position as much as the amount of sink z of the lens holder 1 measured from the designed neutral point. Hence, the lens holder 1 is lifted in the direction of the shaft as much as is shifted in the above-described manner, so that the drive coils 3 and 4 and the magnets 6 are confronted straightly with each other being at the neutral point. That is, the objective lens 2 (and accordingly the lens holder 1) can be held at the designed neutral point when actually used while being affected by gravity (see FIG. 8).

For clarification in illustration, the drive coils 3 and 4 are not shown in FIGS. 7 and 8.

As is apparent from the above description, with the embodiment of the invention, the objective lens can be held at the designed neutral point without application of the offset voltage to the drive coils, which eliminates the difficulties accompanying the conventional device that the drive coils generate heat, and the power consumption is increased as much.

Figure 9:
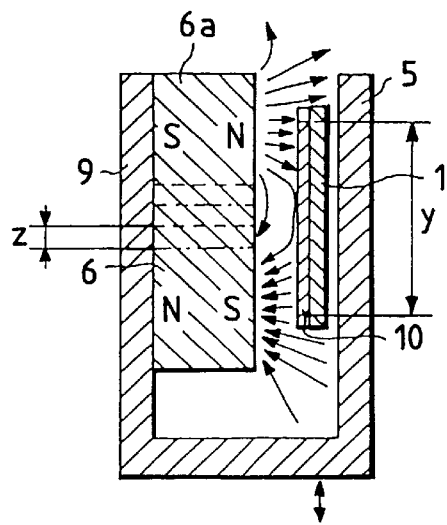
FIG. 9 is a vertical sectional view of essential components of another objective lens driving device, which constitutes a second embodiment of the invention.

FIG. 9 is a vertical sectional view showing another objective lens driving device, which constitutes a second embodiment of the invention.

The second embodiment is different from the above-described first embodiment in that the designed position of magnetization of the focusing magnet section 6a in the focusing direction is shifted upwardly in the direction of the shaft as much as the amount of sink z of the lens holder 1 measured from the designed neutral point (as indicated by the dotted lines). The magnetic pieces 10 are positioned similarly as in the case of the conventional device.

It goes without saying that the second embodiment thus constructed has the same effects as the first embodiment.

In practice, because of this shift, the upper and lower portions of the focusing magnet section 6a become unbalanced with each other. However, since the value z is much smaller than the vertical length of the focusing magnet section 6a, the magnet section 6a is maintained unchanged in characteristic. Further, since the position of magnetization is changed by use of a magnetizing jig, the change can be readily changed.

While the invention has been concretely described in connection with its preferred embodiments, it should be noted that the invention is not limited thereto or thereby; that is, it will be obvious to those skilled in the art that various changes and modifications may be made therein without departing from the invention. For instance, in the above-described embodiments, the magnetic pieces 10 are provided confronted with the focusing magnet sections 6a; however, they may be so arranged as to confront with the tracking magnet sections 6b, or to confront with both the focusing magnet sections 6a and the tracking magnet sections 6b.

Furthermore, in the above-described embodiments, in order to reduce the weight of the lens holder side, the drive coils 3 and 4 are mounted on the lens holder 1, and the magnets 6 are mounted on the stationary member, namely, the outer yoke 9. However, the device may be so designed that the magnets 6 are mounted on the lens holder 1, and the drive coils 3 and 4 are mounted on the outer yoke 9.

As described above, in the objective lens driving device of the invention, the magnetic pieces whose positions are designed with respect to the lens holder, are shifted downwardly in the direction of the shaft as much as the actual amount of sink of the lens holder measured from the designed neutral point which is due to the gravity of the lens holder, or the designed positions of magnetization of the magnets in the focusing direction are shifted upwardly in the direction of the shaft as much as the actual amount of sink of the lens holder. Accordingly, the drive coils and the magnets are confronted straightly with each other at the neutral point. Hence, with the device of the invention, the objective lens can be held at the neutral point without application of current to the drive coils.

What is claimed is:

1. An objective lens driving device, comprising:

a lens holder bearing an objective lens;

drive coils mounted on said lens holder;

a stationary member;

magnets mounted on said stationary member, said drive coils being confronted with said magnets, and said lens holder being moved in a focusing direction and a tracking direction by application of current to said drive coils; and magnetic pieces provided on said lens holder and arranged in magnetic circuits including said magnets, magnetic attraction forces acting on said magnetic pieces producing restoring forces two-dimensionally in the focusing direction and in the tracking direction to hold said objective lens at a designed neutral point;

wherein said magnetic pieces are so arranged that, at said designed neutral point, said drive coils are confronted directly with said magnets;

wherein said magnetic pieces are shifted downwardly by an actual amount of sink of said lens holder with respect to said designed neutral point, said sink resulting from gravity of said lens holder, so that said drive coils and said magnets confront each other directly at said designed neutral point.

2. An objective lens driving device, comprising:

a lens holder bearing an objective lens;

drive coils mounted on said lens holder;

a stationary member;

magnets mounted on said stationary member, said drive coils being confronted with said magnets, and said lens holder being moved in a focusing direction and a tracking direction by application of current to said drive coils; and magnetic pieces provided on said lens holder and arranged in magnetic circuits including said magnets, magnetic attraction forces acting on said magnetic pieces producing restoring forces two-dimensionally in the focusing direction and in the tracking direction to hold said objective lens at a designed neutral point;

wherein said magnetic pieces are so arranged that, at said designed neutral point, said drive coils are confronted directly with said magnets;

wherein positions of magnetization of said magnets in said focusing direction are shifted upwardly by an actual amount of sink of said lens holder with respect to said designed neutral point, said sink resulting from gravity of said lens holder, so that said drive coils and said magnets confront each other directly at said designed neutral point.

3. An objective lens driving device, comprising:

a lens holder bearing an objective lens;

a stationary member;

drive coils mounted on said stationary member;

magnets mounted on said lens holder, said drive coils being confronted with said magnets, and said lens holder being moved in a focusing direction and a tracking direction by application of current to said drive coils; and magnetic pieces provided on said stationary member and arranged in magnetic circuits including said magnets, magnetic attraction forces acting on said magnetic pieces producing restoring forces two-dimensionally in the focusing direction and in the tracking direction to hold said objective lens at a designed neutral point;

wherein centers of said magnetic pieces in said focusing direction are shifted upwardly by an actual amount of sink of said lens holder with respect to said designed neutral point, said sink resulting from gravity of said lens holder, so that said drive coils and said magnets confront each other directly at said designed neutral point.

4. An objective lens driving device, comprising:

a lens holder bearing an objective lens;

a stationary member;

drive coils mounted on said stationary member; magnets mounted on said lens holder, said drive coils being confronted with said magnets, and said lens holder being moved in a focusing direction and a tracking direction by application of current to said drive coils; and magnetic pieces provided on said stationary member and arranged in magnetic circuits including said magnets, magnetic attraction forces acting on said magnetic pieces producing restoring forces two-dimensionally in the focusing direction and in the tracking direction to hold said objective lens at a designed neutral point;

wherein positions of magnetization of said magnets in said focusing direction are shifted downwardly by an actual amount of sink of said lens holder with respect to said designed neutral point, said sink resulting from gravity of said lens holder, so that said drive coils and said magnets confront each other directly at said designed neutral point.

\* \* \* \* \*